United States Patent [19]

Plumley et al.

[11] Patent Number: 4,785,622
[45] Date of Patent: Nov. 22, 1988

[54] INTEGRATED COAL GASIFICATION PLANT AND COMBINED CYCLE SYSTEM WITH AIR BLEED AND STEAM INJECTION

[75] Inventors: Donald R. Plumley, Scotia; Ashok K. Anand, Clifton Park, all of N.Y.

[73] Assignee: General Electric Company, Schenectady, N.Y.

[21] Appl. No.: 854,370

[22] Filed: Apr. 21, 1986

Related U.S. Application Data

[63] Continuation of Ser. No. 677,375, Dec. 3, 1984, abandoned.

[51] Int. Cl.$^4$ ............... F02B 43/00; F02G 3/00
[52] U.S. Cl. ............... 60/39.12; 60/39.182; 60/39.55
[58] Field of Search ............... 60/39.12, 39.182, 39.55, 60/39.3, 736

[56] References Cited

U.S. PATENT DOCUMENTS

| | | | |
|---|---|---|---|
| 2,959,005 | 11/1960 | Zaba | 60/39.3 |
| 3,703,807 | 11/1972 | Rice | 60/39.182 |
| 3,832,845 | 9/1975 | Aguet | 60/39.55 |
| 3,930,367 | 1/1976 | Gasparoli | 60/39.182 |
| 4,058,974 | 11/1977 | Pfenninger | 60/39.182 |
| 4,472,936 | 9/1984 | Uchiyama et al. | 60/39.12 |
| 4,488,398 | 12/1984 | Noguchi | 60/39.12 |

FOREIGN PATENT DOCUMENTS

| | | | |
|---|---|---|---|
| 68608 | 6/1977 | Japan | 60/39.12 |
| 35108 | 3/1980 | Japan | 60/39.55 |
| 54736 | 3/1984 | Japan | 60/39.182 |
| 523998 | 8/1976 | U.S.S.R. | 60/39.182 |

Primary Examiner—Louis J. Casaregola
Assistant Examiner—Donald E. Stout
Attorney, Agent, or Firm—Jerome C. Squillaro

[57] ABSTRACT

An integrated coal gasification plant and combined cycle system employs a supply of compressed air bled off at an intermediate pressure from an air compressor portion of a gas turbine to supply the compressed-air needs of an oxygen plant associated with the coal gasification plant. The high-temperature exhaust from the turbine section of the gas turbine is employed to generate steam in a heat recovery steam generator. The steam drives a steam turbine to produce additional mechanical output. In order to compensate for the removal of the compressed air fed to the oxygen plant, the spent steam from the steam turbine is added to the compressed air and fuel in the combustor portion of the gas turbine. The unexpended energy in the steam fed to the combustor is recovered by expansion in the turbine of the gas turbine and by absorption in the heat receovery stem generator. The release of steam through the gas turbine, and other disclosed techniques, permits elimination of the capital cost of a condenser and cooling tower which would otherwise be required. In addition, the direct provision of compressed air to the oxygen plant eliminates the capital and operating cost of the separate compressor and electric motor conventionally required to provide such compressed air.

3 Claims, 2 Drawing Sheets

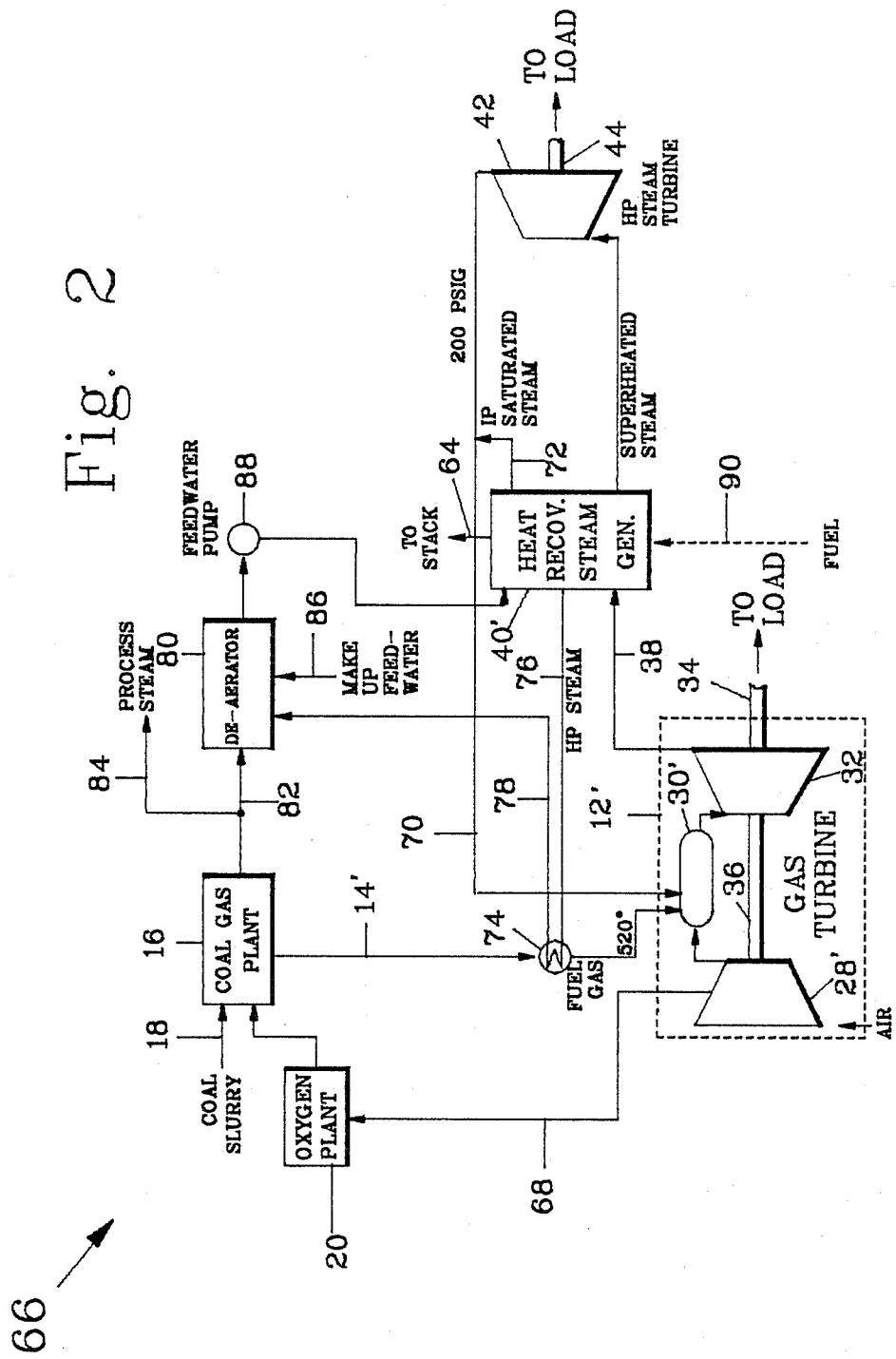

INTEGRATED COAL GASIFICATION PLANT AND COMBINED CYCLE SYSTEM WITH AIR BLEED AND STEAM INJECTION

This application is a continuation of application Ser. No. 677,375 filed Dec. 3, 1984 now abandoned.

BACKGROUND OF THE INVENTION

The present invention relates to energy conversion devices and, more particularly, to a combined cycle gas and steam turbine system integrated with a coal gasification plant.

Gas turbines are frequently employed in, for example, electric generating installations, in order to take advantage of their rapid start-up and shutdown capabilities. For example, a gas turbine may be brought up from an inactive condition to full operation, as well as from full operation to a shut-down condition, in a matter of minutes. The simplicity afforded by this rapid start-up and shut-down capability is in contrast to the relatively slow and complex start-up and shut-down of large base-load steam turbines which are more economically maintained in operation for long periods measured, for example, in years. Although flexible in their ability to be started and stopped, gas turbines suffer thermodynamic inefficiency due to the relatively large part of the heat generated by fuel burning therein passing out unused in the exhaust therefrom. An exhaust temperature of, for example, 1030 degrees F. is conventional for a commercial gas turbine. Under normal conditions, a gas turbine generator has a thermodynamic efficiency of about 31 percent. In contrast, the thermodynamic efficiency of a base-load steam turbine power plant is on the order of about 38 percent. This difference in efficiency dictates that a gas turbine used in generating electricity in an electric network be customarily used for relatively short times, principally as a relatively high-cost peaking generation element which is started up only when the base-load apparatus is unable to sustain the system energy usage, and is shutdown as soon as the peak energy usage has passed.

Combined cycle systems include means for recovering the sensible heat available in the gas turbine exhaust for further use. One combined cycle system employs a heat recovery steam generator using gas turbine exhaust heat to generate steam which is then available to a using process such as, for example, a steam turbine. A combined cycle system using a heat recovery steam generator having a high pressure steam turbine followed by an intermediate pressure steam turbine is capable of a thermodynamic efficiency of about 46 percent.

Gas turbines require a clean fuel such as, for example, a liquid gaseous hydrocarbon. Both liquid and gaseous hydrocarbons are expected to become more scarce and expensive. A large quantity of coal is available but, due to the presence of unburned carbon, ash and other contaminants generated during direct use, coal is unsatisfactory for direct use in a gas turbine. Coal gasification may be employed to convert a substantial portion of the hydrocarbon in coal into a clean low-energy or medium-energy gaseous fuel suitable for use in a gas turbine. A preferred coal gasification process employs an oxygen plant to produce pure oxygen. The use of oxygen instead of air in the coal gas plant avoids the presence of nitrogen in the coal gas. Such nitrogen would not only reduce the heating value of the coal gas, but also may contribute to the generation of NOx emissions. After cleaning to remove particulate and chemical pollutants (principally sulfur), the coal gas is burned in the gas turbine.

A coal gasification plant may be integrated with a combined cycle system to produce an integrated plant in which the fuel gas produced by the coal gasification plant is fed directly to the combined cycle system for immediate consumption, or is stored for later consumption. Immediate consumption permits taking advantage of certain sources of thermodynamic efficiency such as, for example, the use of some of the waste heat energy of the coal gasification process to at least partly preheat the fuel gas fed to the gas turbine.

It will be clear to one skilled in the art, the improvement in thermodynamic efficiency obtained in a combined cycle system comes at the expense of increased capital cost. Substantial elements of cost in a combined cycle system are the condenser and a cooling tower which are conventionally required for condensing the spent steam from the steam turbine. Although a non-condensing steam cycle may be used, such a cycle is conventionally relatively inefficient since it requires venting a substantial portion of the spent steam from the steam turbine in order to permit recycling the remaining water in the spent steam. Venting steam wastes a substantial quantity of unused heat with it which may effect a substantial reduction in thermodynamic efficiency.

OBJECTS AND SUMMARY OF THE INVENTION

Accordingly, it is an object of the invention to provide an integrated gas plant and combined cycle system which overcomes the drawbacks of the prior art.

It is a further object of the invention to provide an integrated system in which a non-condensing steam system is employed to inject a portion of its spent steam from a high pressure steam turbine into a turbine portion of a gas turbine. The total mass flow rate through the turbine portion of the gas turbine is adjusted to a design value by bleeding off a portion of the compressed air from an intermediate stage of the compressor portion of the gas turbine. This permits the use of a standard gas turbine design, without requiring redesign, to accommodate a greater mass flow rate in the turbine portion. The steam exiting the high pressure steam turbine and fed to the gas turbine is at a pressure corresponding to the pressure of steam fed to conventional intermediate pressure turbine. The energy remaining in this intermediate-pressure steam is captured through expansion in the gas turbine thereby permitting omission of an intermediate pressure turbine.

It is a further object of the invention to provide an integrated gas plant and combined cycle system which eliminate the need for a condenser and cooling tower.

It is a further object of the invention to provide an integrated gas plant and combined cycle system which has increased efficiency at reduced capital cost, especially in power plants in the range of from about 50 to about 100 megawatts of electrical output.

It is a further object of the invention to provide an integrated gas plant and combined cycle system which employs a single section stream turbine which vents its spent steam to the combustor of a gas turbine.

It is a further object of the invention to provide an integrated gas plant and combined cycle system which vents intermediate pressure steam from a single-stage steam turbine into a combustor of a gas turbine. The injected steam reduces the NOx emissions of the gas turbine and expands in the turbine portion of the gas turbine to produce additional output energy. The heat remaining in the mixture of steam, as well as products of combustion and excess air exiting the gas turbine, is recovered in a heat recovery steam generator.

It is a further object of the invention to provide an integrated gas plant and combined cycle system in which compressed air for an oxygen plant is obtained by bleeding off air at an intermediate stage of the air compressor of the gas turbine while compensating for the reduced mass flow occasioned by the reduction in compressed air passing to the turbine portion of the gas turbine by injecting a portion of the steam generated in the heat recovery steam generator portion of the combined cycle system into the turbine portion.

Briefly stated, the present invention provides an integrated coal gasification plant and combined cycle system in which a supply of compressed air, bled off at an intermediate pressure from an air compressor portion of a gas turbine, supplies the compressed-air needs of an oxygen plant associated with the coal gasification plant. The high-temperature exhaust from the turbine section of the gas turbine is employed to generate steam in a heat recovery steam generator. The steam drives a steam turbine to produce additional mechanical output. In order to compensate for the removal of the compressed air fed to the oxygen plant, the spent steam from the steam turbine is added to the compressed air and fuel in the combustor portion of the gas turbine. The unexpended energy in the steam fed to the combustor is recovered by expansion in the turbine portion of the gas turbine and by absorption in the heat recovery steam generator. The release of steam through the gas turbine, and other disclosed techniques, permits the use of a non-condensing system and thus permits elimination of the capital cost of a condenser and cooling tower which would otherwise be required. In addition, the direct provision of compressed air to the oxygen plant eliminates the capital and operating costs of the separate compressor and electric motor conventionally required to provide such compressed air.

According to an embodiment of the invention, there is provided an integrated combined cycle system comprising a coal gas plant effective for producing a supply of a gaseous fuel, a gas turbine of a type including an air compressor, a combustor and a turbine, the air compressor being of a type effective to produce a first supply of compressed air, means for connecting the supply of gaseous fuel from the coal gas plant to the combustor, an oxygen plant for producing a supply of oxygen for use in the coal gas plant, the oxygen plant being of a type requiring a second supply of compressed air, means for diverting a portion of the first supply of compressed air equal to the second supply of compressed air and for connecting the portion to the oxygen plant, means for supplying a remainder of the first supply of compressed air to the combustor wherein the gaseous fuel is burned with the remainder of the first supply of compressed air, a heat recovery steam generator receiving an exhaust from the turbine and effective for generating a supply of steam, means for applying at least a portion of the steam for expansion in the turbine and the at least a portion of the steam having a mass flow rate sufficient to substantially compensate for the first supply of compressed air diverted from the air compressor whereby a total mass flow rate through the turbine is substantially equal to a total mass flow rate of the first supply of compressed air.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a simplified block diagram of an integrated gas plant and combined cycle system according to an embodiment of the present invention.

DETAILED DESCRIPTION OF THE PREFERRED EMBODIMENT

Figure 1:
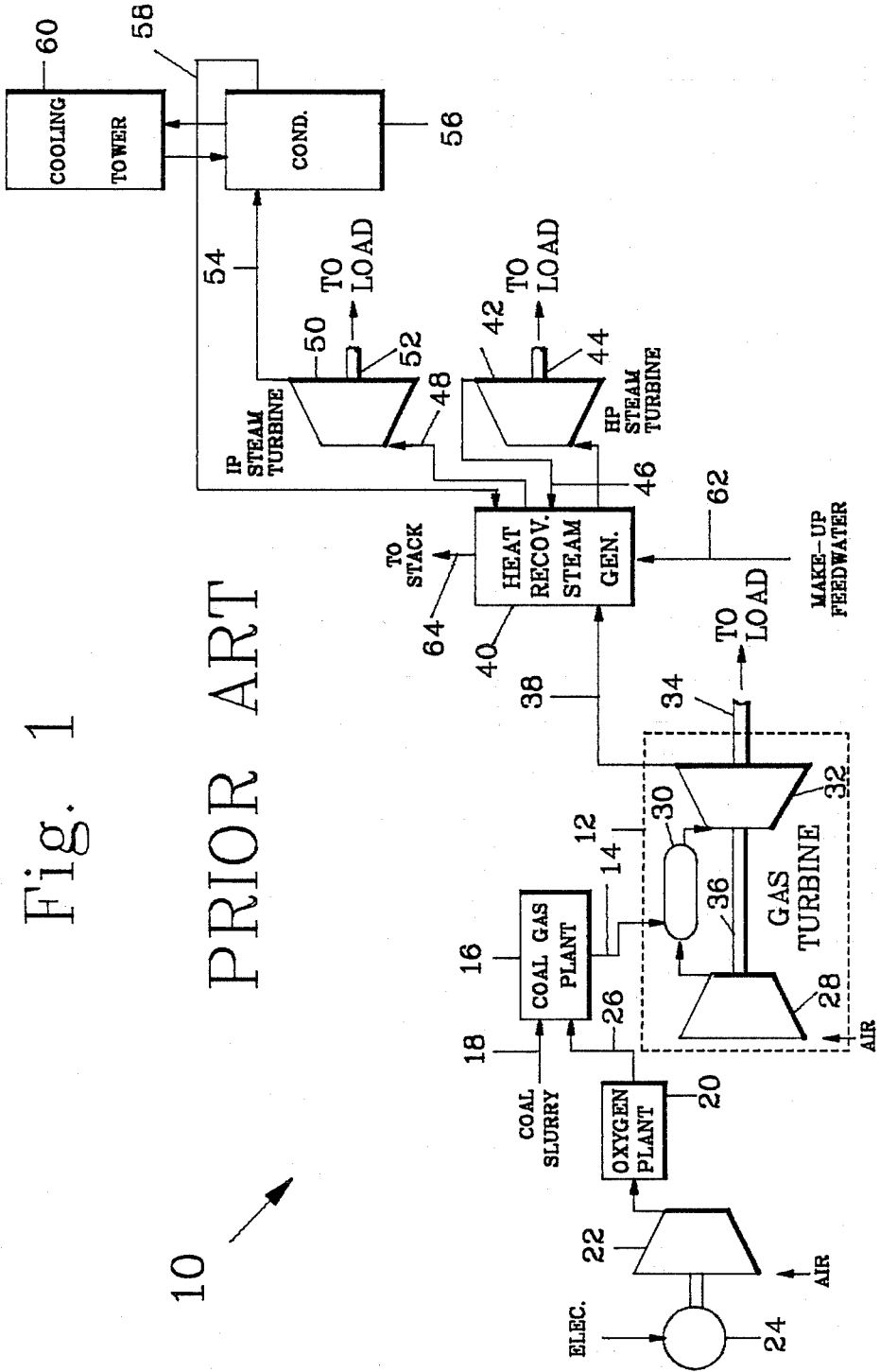
FIG. 1 is a simplified block diagram of an integrated gas plant and combined cycle system according to the prior art.

The present invention is directed toward a system having improved economics in producing a mechanical output. The mechanical output of the system described herein may be employed for driving any suitable process or for simultaneously driving a plurality of different processes with different ones of its mechanical outputs. If the outputs are used by different processes, the mechanical output of the system is the sum of the separate mechanical outputs. If the system is used to drive an electric generator, the gas turbine and steam turbine output shafts may be concentrically coupled to the generator shaft to produce a single electric output. The reduction in overall efficiency occasioned by the conversion from mechanical to electrical output is not of concern to the present invention. In an alternative embodiment, the mechanical output of the gas turbine may be employed to drive one process such as, for example, an electric generator, and the mechanical output of the steam turbine may be employed to drive a different equipment such a, for example, a second separate electric generator.

Referring to FIG. 1, there is shown, generally at 10, an integrated combined cycle system according to the prior art. A gas turbine 12 receives a gaseous fuel on a line 14 from a coal gas plant 16. Coal gas plant 16 receives a coal slurry on a coal slurry line 18. A conventional oxygen plant 20 receives a supply of compressed air from an air compressor 22 driven by an electric motor 24 and delivers a supply of substantially pure oxygen on a line 26 to coal gas plant 16. The gaseous fuel produced by coal gas plant 16 may be a coal gas of low heating content or the coal gas produced in coal gas plant 16 may be further reacted by known methods such as, for example, the Frischer Tropsch process, to produce a higher energy fuel gas such as, for example, methane. If integrated combined cycle system 10 is employed to generate electricity, a portion of the generated electricity may be used to drive electric motor 24. Otherwise, the electricity to drive electric motor 24 must be purchased. The amount of electric power consumed by electric motor 24 is about 8 megawatts for a small sized integrated combined cycle system 10 and thus represents a substantial economic penalty in reduced power output, if integrated combined cycle system 10 is employed to produce electric power, or in increased power cost, if the power must be purchased.

It is herein assumed that coal gas plant 16 and oxygen plant 20 are conventional and that the several processes and equipments therein are so well known to those skilled in the art that further description thereof would not add to the value of the disclosure herein. Further description of coal gas plant 16 and 20 is therefore omitted.

Gas turbine 12 includes an air compressor 28 which feeds compressed air at about 150 psig to a combustor 30. The fuel gas on line 14 is burned with the compressed air in combustor 30 to produce a rapidly flowing stream of a high-temperature mixture of products of combustion and excess air which is fed to a turbine 32. Turbine 32 includes vanes or buckets (not shown) therein which are impacted by the gas mixture to forcibly rotate an output shaft 34 which may be connected to any convenient load (not shown). A common shaft 36 couples a portion of the energy produced by turbine 32 to rotate air compressor 28.

An exhaust duct 38 from turbine 32 conveys a flow of exhaust products to a conventional heat recovery steam generator 40. The exhaust products on exhaust duct 38 are at a temperature of about 1030 degrees F. and therefore contain a substantial amount of heat energy which it is the task of heat recovery steam generator 40 to capture for further use. Heat recovery steam generator 40 conventionally contains a high pressure steam generator and superheater (not shown) for producing a supply of steam superheated to about 950 degrees F. for application to a high pressure steam turbine 42. Expansion of the steam in high pressure steam turbine 42 rotates an output shaft 44 which may be connected to a load (not shown). The steam exiting high pressure steam turbine 42 does so at a temperature of about 625 degrees F. and a pressure of about 200 psig and thus still contains a substantial amount of heat energy which may be further utilized.

Heat recovery steam generator 40 may contain a conventional reheater (not shown) which receives the spent steam from high pressure steam turbine 42 on a line 46, adds heat thereto, and delivers the reheated steam on a line 48 to an intermediate pressure turbine 50. Expansion of the steam in intermediate pressure turbine 50 rotates an output shaft 52 which may be connected to a load (not shown). Spent steam from intermediate pressure turbine 50 is connected on a line 54 to a condenser 56 wherein it is condensed to water for return on a return line 58 to heat recovery steam generator 40. A conventional cooling tower 60 may be provided for condensing the spent steam entering condenser 56. Make-up feedwater is added to heat recovery steam generator 40 on a make-up feedwater line 62. After having given up substantially all of its heat, the gas and steam exit heat recovery steam generator 40 on an exhaust conduit 64 at a temperature of about 280 degrees F. on its way to an exhaust stack (not shown).

In addition to the elements mentioned above, heat recovery steam generator 40 may additionally contain suitable economizers and additional evaporators (not shown) which are not of concern to the present invention.

Although output shafts 34, 44 and 52 are shown separated, these shafts may be concentrically connected together for concertedly driving a single load such as, for example, an electric generator (not shown).

Referring now to FIG. 2, there is shown, generally at 66 an integrated combined cycle system according to an embodiment of the invention in which elements corresponding to those identified in FIG. 1 are given the same reference designators. Slightly modified elements are given primed values of the same reference designators.

Air compressor 28' in gas turbine 12' includes a bleed line 68 which bleeds off a sufficient quantity of compressed air at an intermediate pressure of about 80 psig to satisfy the entire compressed air needs of oxygen plant 20. In the preferred embodiment of the invention, about 20 percent of the total air capacity of air compressor 28' is bled off through bleed line 68. With the entire compressed air needs of oxygen plant 20 satisfied, air compressor 22 and electric motor 24 of the prior art (FIG. 1) can be omitted. Omission of these elements eliminates their inherent energy inefficiencies as well.

It is, of course, economical and desirable to be able to employ conventional equipment without major redesign. Conventional gas turbines are designed as a unit in which the air and fuel mass flow rates in air compressor 28' and 30' are matched to the mass flow rate required for efficient operation of turbine 32. In the embodiment of the invention shown in FIG. 2, however, the mass flow rate of compressed air entering combustor 30' is reduced by the 20 percent bled off to reed oxygen plant 20. This reduced mass flow rate of compressed air is thus insufficient to satisfy the required mass flow rate of turbine 32 if a conventional gas turbine 12' is to be employed. Compensation for the reduced air mass flow rate is provided by a steam-injection conduit 70 which feeds spent steam from high pressure steam turbine 42 into combustor 30'. This spent steam is at a pressure of about 200 psig and a temperature of about 625 degrees F. and thus still contains a substantial amount of heat energy. Besides making up for the bled-off compressed air, the steam injected into combustor 30' provides other desirable effects. In particular, the injected steam is expanded in turbine 32 to recover part of its heat energy. The expanded steam exits turbine 32 on exhaust duct 38 with the same relatively high temperature as the remainder of the effluent of turbine 32. This remaining energy is substantially recovered in heat recovery steam generator 40' without the need for an intermediate pressure turbine 50 (FIG. 1). In addition to augmenting the mass flow rate through turbine 32 and recovering the heat energy in the spent steam from high pressure steam turbine 42, the injection of steam into combustor 30' also reduces the flame temperature within combustor 30' and thereby reduces the generation of NOx pollutants.

It fortuitously turns out that the mass flow rate of spent steam exiting high pressure steam turbine 42 is almost equal to the amount required to compensate for the mass flow rate of compressed air bled off by bleed line 68 to oxygen plant 20, considering the differences in mass per unit volume of air and steam. Under some operating conditions, it may be necessary or desirable to augment the steam from high pressure steam turbine 42. This is accomplished by providing an intermediate pressure steam conduit 72 from a conventional intermediate pressure evaporator (not shown) within heat recovery steam generator 40'. Steam in intermediate pressure steam conduit 72 adds to the steam in steam-injection conduit 70 for flow to combustor 30'.

A fuel gas heat exchanger 74 is optionally provided in line 14' for preheating the fuel gas from coal gas plant 16 to, for example, about 520 degrees F. before it is burned in combustor 30'. By reducing the amount of heat which must be added to the fuel gas before and during combustion, such preheating adds to the thermodynamic efficiency of gas turbine 12'. The heat for fuel gas heat exchanger 74 is obtained from high pressure saturated steam, or a mixture of water and saturated steam, at a temperature of about 600 degrees F. and a pressure of about 1600 psig, taken on a line 76 from a conventional high-pressure evaporator (not shown) in heat recovery steam generator 40'. While giving up its heat to the fuel gas in fuel gas heat exchanger 74, substantially all of the steam is converted to water at about atmospheric pressure and a temperature of about 280 degrees F. The water from fuel gas heat exchanger 74 is fed on a line 78 to a de-aerator 80.

Coal gas plant 16 is conventionally of a type which generates a quantity of low-pressure process steam. At least a portion of such process steam may be applied on a line 82 to de-aerator 80. If an excess of process steam is available from coal gas plant 16, it may optionally be conveyed on a line 84 to external using processes (not shown) which are not of concern to the present disclosure.

A supply of make-up feedwater is applied to de-aerator 80 on a make-up feedwater line 86. A feedwater pump 88 returns the de-aerated feedwater from de-aerator 80 to heat recovery steam generator 40'.

As a result of the steam released from high pressure steam turbine 42 to the atmosphere by expansion in turbine 32 and of the cooling of high pressure steam in fuel gas heat exchanger 74, operation of integrated combined cycle system 66 is enabled without the use of a condenser 56 or a cooling tower 60 (FIG. 1). In addition, since the heat energy in the intermediate pressure steam exiting high pressure steam turbine 42 is recaptured by expansion in turbine 32 and absorption in heat recovery steam generator 40', the need for intermediate pressure turbine 50 (FIG. 1) is eliminated. One skilled in the art would immediately recognize the large capital cost reduction obtainable by eliminating intermediate pressure turbine 50, condenser 56 and cooling tower 60. In addition, the elimination of intermediate pressure turbine 50 and the substitution of the more efficient process of expansion in turbine 32, followed by additional heat recovery in heat recovery steam generator 40', increases the efficiency of integrated combined cycle system 66 of FIG. 2 over integrated combined cycle system 10 of FIG. 1. In accordance with the common engineering principal that a large unit is more efficient than a smaller unit, it is reasonable to assume that the efficiency of air compressor 28' is greater than the efficiency of air compressor 22 (FIG. 1), the need for which is eliminated by the present invention. In addition, by eliminating electric motor 24 (FIG. 1) and directly producing compressed air, rather than first producing or buying electricity, and then consuming the electricity in electric motor 24, both of which processes are far less than 100 percent efficient, two of the intermediate inefficiencies of the three-step process of producing electricity; namely, the electric generation and consumption, are eliminated, and the remaining process of air compression is performed in an apparatus which may be more efficient than the air compression apparatus employed in the prior art.

As is well known by one skilled in the art, the temperature of the exhaust products entering heat recovery steam generator 40' is lower than is desirable from the strict point of view of capturing the maximum amount of heat energy from the exhaust products. Temperatures of several hundred degrees higher than the 1030 degrees F. are generally preferred. In order to accomplish an increase in the heat transfer in heat recovery steam generator 40', and/or to increase the amount of steam generated in heat recovery steam generator 40', an auxiliary source of heat may be applied such as, for example, by applying a liquid or gaseous fuel to heat recovery steam generator 40' on a fuel line 90 for burning therein in a conventional burner (not shown).

Although output shafts 34 and 44 are shown as separate elements which may be connected to different loads, one conventional application employs concentric output shafts 34 and 44 on a single using process such as, for example, an electric generator.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An improved integrated coal gas and combined cycle plant including;
  a coal gas plant for producing gaseous fuel; an oxygen plant for supplying oxygen to said coal gas plant, a gas turbine plant producing a hot exhaust gas, a heat recovery steam generator receiving said hot exhaust gas and for producing a steam output, a non-condensing steam turbine for receiving said steam generator output; and, wherein the improvement comprises;
  means for a portion of the gas turbine plant compressed air to the oxygen plant;
  means for delivering substantially all of the steam turbine exhaust to the gas turbine plant combustor whereby the mass flow rate through the gas turbine plant remains substantially constant; and,
  a high pressure steam tap from said heat recovery steam generator to a gaseous fuel preheater whereby substantially all of the high pressure steam is converted back to feedwater.

2. The improved plant recited in claim 1 wherein the improvement further comprises:
  an intermediate pressure steam tap from said heat recovery steam generator to said steam turbine exhaust delivery means for selectively augmenting the steam supply to said gas turbine plant.

3. An integrated coal gasification and combined cycle power plant comprising:
  a coal gasification plant for producing coal gas;
  an oxygen plant for producing oxygen for the coal gasification plant;
  a combined cycle plant including a steam turbine, a heat recovery steam generator and a gas turbine plant; the gas turbine plant receiving coal gas from the coal gasification plant and including an air compressor, a combustor and a gas turbine;
  means for delivering at least a portion of the steam turbine exhaust to the gas turbine plant to replace the diverted air portion whereby the mass flow through the gas turbine plant remains constant;
  means for tapping off unexpanded steam from the heat recovery steam generator to augment the flow of steam to the gas turbine plant; and,
  means for heating the coal gas delivered to the gas turbine plant including heat exchange means connected to a second steam tap on the heat recovery steam generator.
  means for diverting a portion of the gas turbine plant compressor air to the oxygen plant;

* * * * *